United States Patent
Yamagami et al.

(10) Patent No.: US 11,814,762 B2
(45) Date of Patent: Nov. 14, 2023

(54) FIBER STRUCTURE MANUFACTURING APPARATUS, FIBER STRUCTURE MANUFACTURING METHOD, AND FIBER STRUCTURE

(71) Applicant: SEIKO EPSON CORPORATION, Tokyo (JP)

(72) Inventors: Toshiaki Yamagami, Nagano (JP); Yoichi Miyasaka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 235 days.

(21) Appl. No.: 17/335,209

(22) Filed: Jun. 1, 2021

(65) Prior Publication Data
US 2021/0381144 A1 Dec. 9, 2021

(30) Foreign Application Priority Data
Jun. 3, 2020 (JP) .................. 2020-096685

(51) Int. Cl.
*D04H 1/60* (2006.01)
*D01B 9/00* (2006.01)
(Continued)

(52) U.S. Cl.
CPC .............. *D04H 1/60* (2013.01); *B29B 13/02* (2013.01); *B29B 15/08* (2013.01); *B29C 70/06* (2013.01); *B29C 70/12* (2013.01); *B29C 70/86* (2013.01); *D01B 9/00* (2013.01); *D21F 11/10* (2013.01); *D21F 11/14* (2013.01)

(58) Field of Classification Search
CPC .......... D21F 9/00; D21F 7/003; D21F 3/0272; D21F 9/046; D21F 11/06; D21F 1/66; D21F 5/004; D21F 5/18; Y02W 30/64
See application file for complete search history.

(56) References Cited

U.S. PATENT DOCUMENTS 6,274,522 B1 8/2001 Sameshima et al.
2016/0068681 A1 3/2016 Ueno

FOREIGN PATENT DOCUMENTS

CN  1179799 A  4/1998
CN  104797415 A  7/2015
(Continued)

*Primary Examiner* — Eric Hug
*Assistant Examiner* — Matthew M Eslami
(74) *Attorney, Agent, or Firm* — Global IP Counselors, LLP

(57) ABSTRACT

A fiber structure manufacturing apparatus includes: a defibration unit that pulverizes and defibrates a fiber raw material that contains fibers; a transportation unit that transports a defibrated material after defibration by the defibration unit; a melting-material mixing unit that mixes a melting material into the defibrated material transported by the transportation unit; a fibrous web forming unit that forms a fibrous web by causing a mixture of the defibrated material and the melting material to accumulate; a sheet supplying unit that supplies a shape retainer sheet to the fibrous web; and a heating-and-pressing mechanism that forms a fiber structure by heating and pressing the fibrous web after the shape retainer sheet is supplied; wherein the sheet supplying unit supplies the shape retainer sheet in such a state that nap is raised on a surface, of the shape retainer sheet, that is to be in contact with the fibrous web.

8 Claims, 7 Drawing Sheets

(51) Int. Cl.
*D21F 11/10* (2006.01)
*D21F 11/14* (2006.01)
*B29C 70/12* (2006.01)
*B29C 70/06* (2006.01)
*B29C 70/86* (2006.01)
*B29B 15/08* (2006.01)
*B29B 13/02* (2006.01)

(56) References Cited

FOREIGN PATENT DOCUMENTS

| | | | |
|---|---|---|---|
| CN | 105401333 A | 3/2016 | |
| JP | H09-001513 A | 1/1997 | |
| JP | H091513 A * | 1/1997 | ............... B27N 3/04 |

* cited by examiner

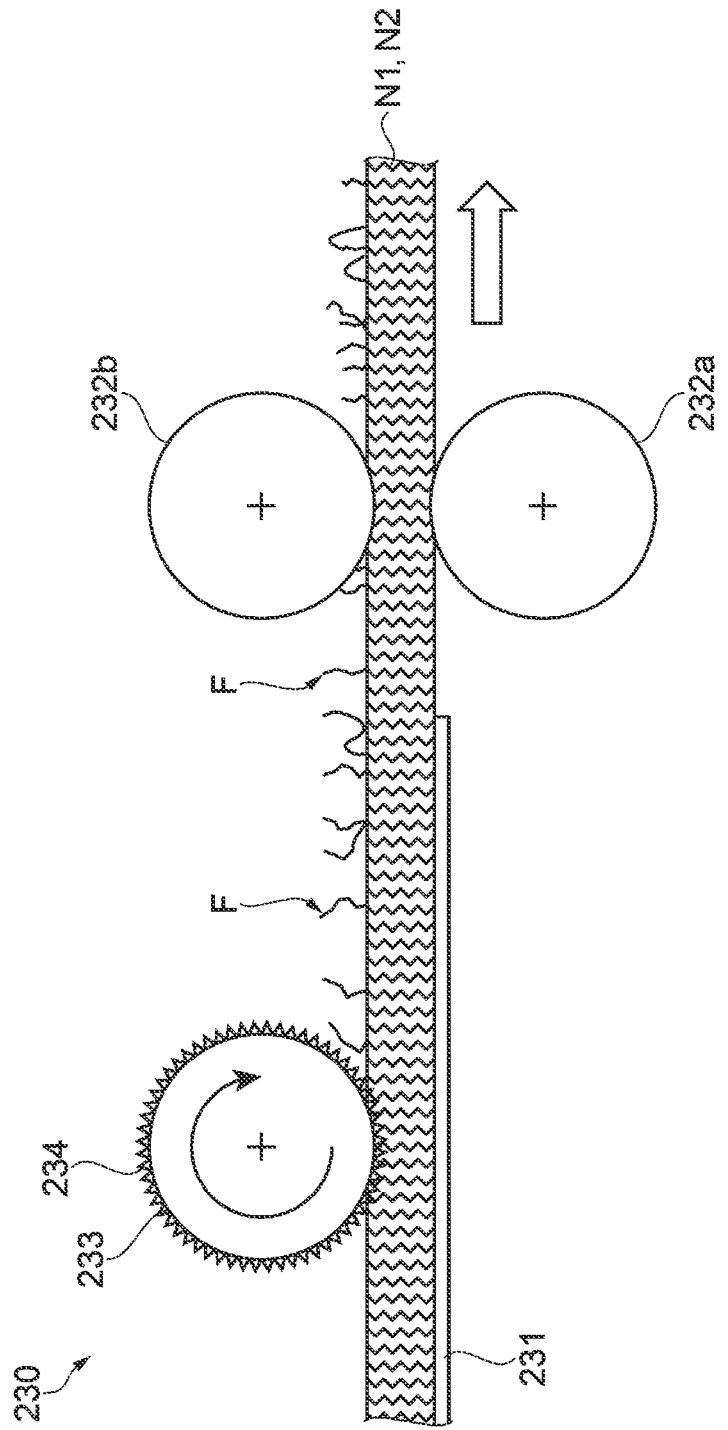

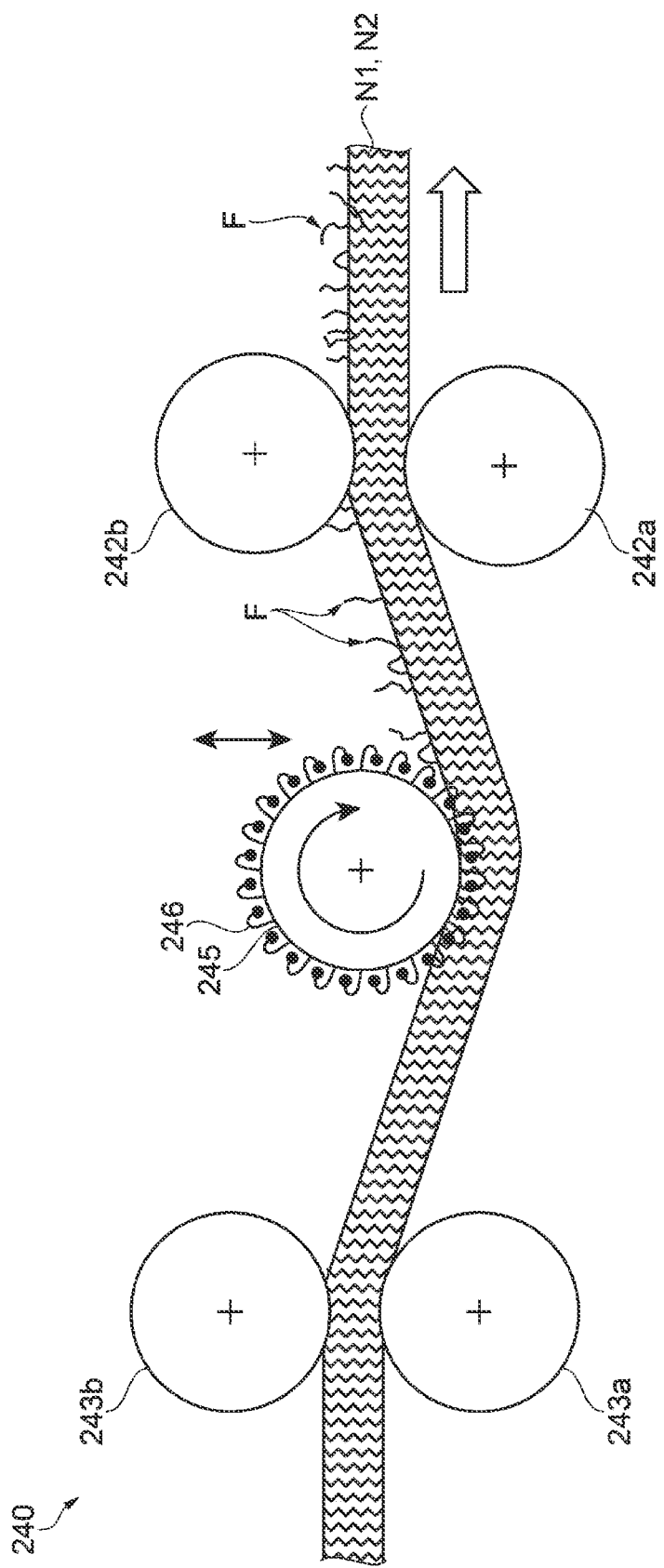

FIBER STRUCTURE MANUFACTURING APPARATUS, FIBER STRUCTURE MANUFACTURING METHOD, AND FIBER STRUCTURE

The present application is based on, and claims priority from JP Application Serial Number 2020-096685, filed Jun. 3, 2020, the disclosure of which is hereby incorporated by reference herein in its entirety.

BACKGROUND

1. Technical Field

Embodiments of the present disclosure relate to a fiber structure manufacturing apparatus, a fiber structure manufacturing method, and a fiber structure.

2. Related Art

In related art, the following method for manufacturing a waste paper board is known. A defibrated material obtained by defibrating waste paper by dry defibration is mixed with a thermoplastic resin to form a continuous web. The formed web is heated in a sandwiched state on an air-permeable conveying support member such as a mesh belt made of metal, thereby manufacturing a waste paper board.

However, in the manufacturing method described above, since the web that is simply sandwiched is heated and pressed, fibers on the surface portion of the waste paper board become frayed easily, and the loss of a shape could occur.

SUMMARY

A fiber structure manufacturing apparatus according to a certain aspect of the present disclosure includes: a defibration unit that pulverizes and defibrates a fiber raw material that contains fibers; a transportation unit that transports a defibrated material after defibration by the defibration unit; a melting-material mixing unit that mixes a melting material into the defibrated material transported by the transportation unit; a fibrous web forming unit that forms a fibrous web by causing a mixture of the defibrated material and the melting material to accumulate; a sheet supplying unit that supplies a shape retainer sheet to the fibrous web; and a heating-and-pressing mechanism that forms a fiber structure by heating and pressing the fibrous web after the shape retainer sheet is supplied; wherein the sheet supplying unit supplies the shape retainer sheet in such a state that nap is raised on a surface, of the shape retainer sheet, that is to be in contact with the fibrous web.

A fiber structure manufacturing method according to a certain aspect of the present disclosure includes: defibrating a fiber raw material that contains fibers by pulverization; transporting a defibrated material after defibration, and mixing a melting material into the defibrated material that is being transported; forming a fibrous web by causing a mixture of the defibrated material and the melting material to accumulate; supplying a shape retainer sheet to the fibrous web in such a state that nap is raised on a surface, of the shape retainer sheet, that is to be in contact with the fibrous web; and forming a fiber structure by heating and pressing the fibrous web after the shape retainer sheet is supplied.

A fiber structure manufacturing method according to another aspect of the present disclosure includes: defibrating a fiber raw material that contains fibers by pulverization; transporting a defibrated material after defibration, and mixing a melting material into the defibrated material that is being transported; forming a fibrous web by causing a mixture of the defibrated material and the melting material to accumulate on a surface of a first shape retainer sheet on the surface of which nap is raised; supplying a second shape retainer sheet to an opposite surface side of the fibrous web such that a surface, of the second shape retainer sheet, on which nap is raised comes into contact with the fibrous web, the opposite surface side being opposite of a surface side at which the first shape retainer sheet is disposed; and forming a fiber structure by heating and pressing the fibrous web sandwiched between the nap-raised surface of the first shape retainer sheet and the nap-raised surface of the second shape retainer sheet.

A fiber structure according to a certain aspect of the present disclosure is manufactured using the above fiber structure manufacturing method.

BRIEF DESCRIPTION OF THE DRAWINGS

FIG. 8 is a schematic diagram that illustrates the configuration of a nap raiser according to another embodiment.

FIG. 9 is a schematic diagram that illustrates the configuration of a nap raiser according to still another embodiment

DESCRIPTION OF EXEMPLARY EMBODIMENTS

Figure 1:
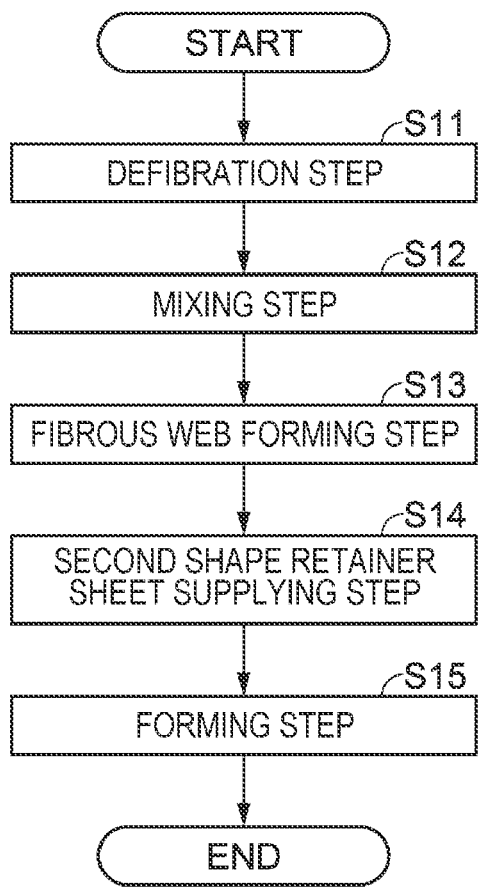
FIG. 1 is a flowchart that illustrates a method for manufacturing a fiber structure.
Figure 2:
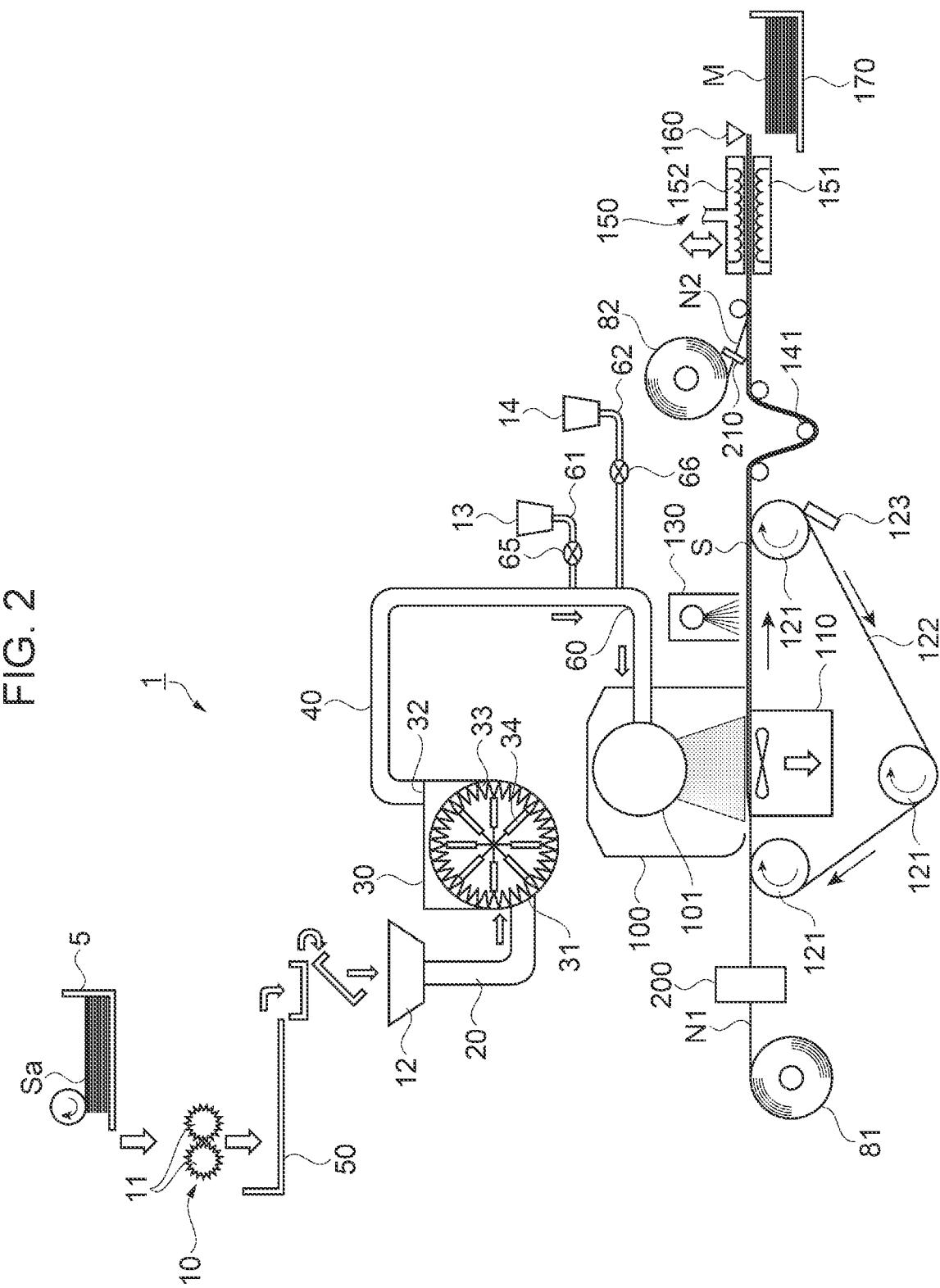
FIG. 2 is a schematic diagram illustrating a schematic configuration of a fiber structure manufacturing apparatus.

With reference to the accompanying drawings, an exemplary embodiment of the present disclosure will now be explained. FIG. 1 is a flowchart that illustrates a method for manufacturing a fiber structure M according to an exemplary embodiment of the present disclosure. FIG. 2 is a schematic diagram illustrating a schematic configuration of a fiber structure manufacturing apparatus 1 according to an exemplary embodiment of the present disclosure. The fiber structure manufacturing apparatus 1 according to the present embodiment is based on a technique of recycling waste paper into a new fiber structure M through a dry process using as little water as possible.

The manufactured fiber structure M can be used as sound-absorbing materials, which absorb sound, and cushioning materials (packing materials), which absorb external shock. The fiber structure M functioning as a sound-absorbing material, when provided inside various home appliances, for example, is able to reduce leakage of operating noise to the outside of the appliances. The uses of the fiber structure M are not limited to home appliances. For example, the fiber structure can be used also for various construction materials, or sound-absorbing materials to be installed in concert halls for acoustic control, etc.

A method for manufacturing the fiber structure M according to an exemplary embodiment of the present disclosure includes a defibration step (step S11) of defibrating a fiber raw material that contains fibers by pulverization; a mixing step (step S12) of transporting a defibrated material after defibration, and mixing a melting material into the defibrated material that is being transported; a fibrous web forming step (step S13) of forming a fibrous web S by causing a mixture of the defibrated material and the melting material to accumulate on a surface of a first shape retainer sheet N1 on the surface of which nap is raised; a second shape retainer sheet supplying step (step S14) of supplying a second shape retainer sheet N2 to an opposite surface side of the fibrous web S such that a surface, of the second shape retainer sheet N2, on which nap is raised comes into contact with the fibrous web S, the opposite surface side being opposite of a surface side at which the first shape retainer sheet N1 is disposed; and a forming step (step S15) of forming a fiber structure M by heating and pressing the fibrous web S sandwiched between the nap-raised surface of the first shape retainer sheet N1 and the nap-raised surface of the second shape retainer sheet N2.

The configuration of the fiber structure manufacturing apparatus 1 capable of manufacturing the fiber structure M is described below.

What is mainly expected to be used as a fiber-containing raw sheet material Sa to be supplied to the fiber structure manufacturing apparatus 1 according to the present embodiment is office waste paper whose recycling routes are yet to be sufficiently established, for example, general waste paper of A4 size, which is currently widely used in offices, confidential office document waste paper, etc. However, not only such office waste paper but also other kinds of waste paper, for example, used corrugated cardboard and waste newspaper, can be used for friendliness to the environment. When such a raw sheet material Sa containing fibers is put into a coarse crusher 10 of the fiber structure manufacturing apparatus 1, the raw sheet material Sa containing fibers is shredded into pieces of several centimeters square by coarse crushing blades 11 of the coarse crusher 10. The coarse crusher 10 having such a shredding function may be preferably equipped with an automatic feed mechanism 5 for continuously inputting the raw sheet material Sa containing fibers. With productivity considered, the higher the input speed of the automatic feed mechanism 5, the better.

The coarse crushing blades 11 of the coarse crusher 10 may be configured as a device whose cutting width is made greater in comparison with the blades of a common shredder. Coarsely crushed pieces (paper pieces) after shredding into the size of several centimeters square by the coarse crushing blades 11 may be supplied to a defibrating process, which is a subsequent process, via a metering feeder 50, a hopper 12, and a coarsely crushed piece (paper piece) inlet pipe 20.

The metering feeder 50 may use any method as long as a fixed amount of a material is put into a defibrator. A vibrating feeder is a preferred example.

A vibrating feeder tends to fail to transport a constant amount of pieces of paper that is light in weight due to the effect of, for example, static electricity. Therefore, preferably, pieces of paper that is light in weight may be formed into a block-like shape by performing multi-feeding, etc. at the coarse crusher 10 in the preceding process. The weight of each block may be preferably 0.5 g to 2 g.

Coarsely crushed pieces may be continuously supplied from the coarse crusher 10 to the vibrating feeder or may be temporarily stored in a flexible container and then supplied therefrom to the vibrating feeder. In the latter case, the flexible container functions as a buffer. Therefore, it is possible to reduce the influence of fluctuations in the amount of collected waste paper on the manufacturing apparatus. Preferably, an amount of coarsely crushed pieces supplied from the flexible container should be enough for continuous production for about one hour or so, although it depends on the amount of production. If a large amount of coarsely crushed pieces are supplied from the flexible container to the vibrating feeder at a time, the vibration of the vibrating feeder will be affected; therefore, it will be advantageous if coarsely crushed pieces are put in from the flexible container little by little. Examples of a method for putting the coarsely crushed pieces in little by little include tilting the flexible container, shaking the flexible container by means of, for example, a motor, and prodding a part of the flexible container with an air cylinder.

The coarsely crushed piece (paper piece) inlet pipe 20 is in communication with an inlet 31 of a dry defibrator 30. The coarsely crushed pieces (paper pieces) fed into the dry defibrator 30 through the inlet 31 are defibrated between a rotating rotor 34 and a stator 33. The dry defibrator 30 has a mechanism for generating a flow of air. Defibrated fibers are carried by the airflow from an outlet 32 to a transport pipe 40, which is an example of a transportation unit.

A specific example of the dry defibrator 30, which is an example of a defibration unit, will now be described. For example, a disc refiner, a turbo mill (manufactured by FREUND-TURBO CORPORATION), a Ceren Miller (manufactured by MASUKO SANGYO CO., LTD), or a dry wastepaper defibrator including a wind generating mechanism such as one disclosed in JP-A-6-93585, etc. can be used as the dry defibrator 30. The size of paper pieces put into such a dry defibrator 30 may be the general size of shredded pieces of paper outputted from a common shredder. With the strength of a manufactured fiber structure M (for example, recycled paper) considered, long fibers will be advantageous. However, if coarsely crushed pieces (paper pieces) are excessively large, it will be difficult to put them into the dry defibrator 30. Therefore, it will be desirable if the coarsely crushed pieces (paper pieces) discharged from the coarse crusher 10 have shredded size of several centimeters square.

In the dry defibrator 30 including a wind generating mechanism, coarsely crushed pieces (paper pieces) are sucked in through the inlet 31 by using an airflow self-generated by the dry defibrator 30, together with the airflow, and are then defibrated and transported toward the outlet 32. The dry defibrator 30 defibrates inputted coarsely crushed pieces (paper pieces) into cotton-like form.

For example, an Impeller Mill 250 (manufactured by Seishin Enterprise Co., Ltd.), which is a turbo-mill-type impeller mill, is capable of generating an airflow having an airflow volume of approximately 3 $m^3$/min at 8,000 rpm (peripheral speed of approximately 100 m/s) by using twelve blades installed at the outlet side. In this case, the airflow velocity at the part closer to the inlet 31 is approximately 4 m/s, and coarsely crushed pieces (paper pieces) are carried into the dry defibrator 30 by the airflow. The coarsely crushed pieces (paper pieces) carried into the dry defibrator 30 are defibrated between the blades rotating at high velocity and the stator and are then discharged from the outlet 32. The discharge velocity is approximately 6.5 m/s for a discharge pipe diameter of φ100.

If the dry defibrator 30 that does not include a wind generating mechanism is used, a blower, etc. configured to generate a flow of air that guides coarsely crushed pieces (paper pieces) into the inlet 31 is provided separately.

In the defibrating process by the dry defibrator 30, it is preferable to defibrate pulp into fibrous form until coarsely crushed pieces (paper pieces) lose their shape because such shape-losing defibration eliminates unevenness of the fiber structure M to be formed in a subsequent process. In this process, for example, printed ink or toner, and coating and additive materials for paper (papermaking chemicals), such as a bleed prevention agent, are also pulverized into grains of several tens of micrometers or less (hereinafter referred to as ink grains and papermaking chemicals). Therefore, the outputs from the dry defibrator 30 are fibers, ink grains, and papermaking chemicals obtained by defibrating the coarsely crushed pieces (paper pieces).

If, for example, a disc refiner is used as the dry defibrator 30, it is preferable to form blades at the circumferential edge thereof in addition to rotary blades formed on the disc-shaped surface thereof in the radial direction. The gap between the rotary blades on the rotor 34 and the stationary blades on the stator 33 is preferably kept to be approximately equal to the thickness of a paper piece, for example, approximately 100 μm to 150 μm. With this configuration, the defibrated material is moved to the outer circumference by the flow of air generated by the rotary blades and is discharged from the outlet 32.

The defibrated material (defibrated fibers) discharged from the dry defibrator 30 (φ100, sectional area of approximately 78 cm$^2$) is sent to a fibrous web forming machine 100 through the transport pipe 40 and a transport pipe 60.

A melting-material transport pipe 61 is provided as a branch pipe branching off from the transport pipe 60.

A melting material is put in from a melting-material hopper 13. The amount of the melting material is controlled by the melting-material control valve 65. The melting material whose amount is controlled is supplied to the transport pipe 60 through the melting-material transport pipe 61 and is able to be mixed into the defibrated fibers transported through the transport pipe 60. The transport pipe 60 is an example of a melting-material mixing unit. The accuracy of the amount of transportation can be increased by controlling the opening degree of the valve by measuring an amount of reduction with a scale on which a feeder is placed.

The pipe diameter of the melting-material transport pipe 61 may be preferably smaller than the pipe diameter of the transport pipe 60. This is because the velocity of an airflow increases and it becomes easier for the melting material to disperse in the airflow.

The melting material maintains the strength of the fiber structure M as a formed product produced from the defibrated fibers and contributes to preventing dispersion of paper dust and fibers. The melting material is added to the defibrated fibers and is fusion-bonded to the defibrated fibers by being heated. The melting material may be any material, such as fibrous materials or powder materials, as long as the material is in solid phase at a room temperature of 20° C. for ease of transportation and is melted by a heating process. However, materials that melt at 200° C. or lower are preferable because, for example, paper yellowing does not occur. Materials that melt at 160° C. or lower are more preferable in terms of energy.

The melting material may preferably contain a thermoplastic resin that melts during heat forming. Fibrous melting materials that are easily intertwined with defibrated cotton fibers will be advantageous for producing low-density products. Preferably, composite fibers having a core-in-sheath structure may be used. Melting materials having a core-in-sheath structure are preferable because a sheath portion exhibits an adhesive function when melted at a low temperature and because a core portion remains in fibrous form to retain the shape. It is preferable to use, for example, ETC and INTACK series, which are manufactured by ES FIBERVISIONS, Inc., or Tetoron (registered trademark), which is a polyester fiber for dry nonwoven fabric manufactured by TEIJIN FIBERS LIMITED.

The fineness of each melting fiber may be preferably 0.5 dtex or more and 2.0 dtex or less. If this value is greater than 2.0 dtex, adhesive strength between a first sheet N1 (a second sheet N2) and a fibrous web (a defibrated-cotton sheet) S will be insufficient. If this value is less than 0.5 dtex, the following problems might occur: a deviation in the position of a core from the center of a sheath in a core-in-sheath structure of a fiber could happen in manufacturing, and it is difficult to discharge the fibers linearly, and, because of a smaller diameter than that of the defibrated fibers in the processes, it is more susceptible to the effect of static electricity, and the melting fibers and the defibrated fibers will be mixed unevenly.

The length of each melting-resin fiber may be preferably about 1 to 10 mm. If the length of each melting-resin fiber is less than 1 mm, it is difficult to retain the shape of the fiber structure M due to insufficient adhesive strength. If the length of each melting-resin fiber is greater than 10 mm, fibers will be formed into balls in airflow, resulting in poorer dispersion of the fibers.

A functional-material transport pipe 62 is provided as a branch pipe branching off from the transport pipe 60 under the melting-material transport pipe 61 branching off from the transport pipe 60. A powder fire retardant is preferably usable in the product. The powder fire retardant is put in as a functional material from a hopper 14. The amount of the powder fire retardant is controlled by a functional-material control valve 66. The powder fire retardant whose amount is controlled is supplied to the transport pipe 60 through the functional-material transport pipe 62. With this configuration, it is possible to mix the powder fire retardant into the defibrated fibers into which the melting material has been mixed, while the defibrated fibers containing the melting material mixed therein are transported through the transport pipe 60. The accuracy of the amount of transportation can be increased by controlling the opening degree of the valve by measuring an amount of reduction with a scale on which a feeder is placed.

The pipe diameter of the functional-material transport pipe 62 may be preferably smaller than the pipe diameter of the transport pipe 60. This is because the velocity of an airflow increases and it becomes easier for the functional material to disperse in the airflow.

The fire retardant is added so as to impart incombustibility to the fibrous web S when the fibrous web S is formed from the defibrated fibers. For example, hydroxides such as aluminum hydroxide and magnesium hydroxide, boric acid, boric acid compounds such as ammonium borate, phosphorus-based organic materials containing, for example, ammonium polyphosphate or phosphoric esters, or nitrogenous compounds such as melamine and isocyanurate are usable for the fire retardant. Among them, it is preferable to use a composite containing melamine and phosphoric acid.

Preferably, the fire retardant may be a solid fire retardant. The average particle diameter of the solid fire retardant may be preferably 1 μm or more and 50 μm or less. If the average particle diameter is less than 1 μm, transportation by airflow will become difficult when the defibrated fibers are accumulated so as to form the fibrous web S in a suction process that is to be performed later. If the average particle diameter is greater than 50 μm, the adhesive power of the solid fire retardant to fibers is reduced, and thus the solid fire retardant is likely to come off the fibers. Since this causes uneven adhesion, the solid fire retardant will be unable to fulfill its fire retardant function enough.

The defibrated fibers into which the melting material and the functional material have been mixed through the transport pipe 60 are fed into the fibrous web forming machine 100, which is an example of a fibrous web forming unit.

The first sheet (first shape retainer sheet) N1 is supplied from a first sheet supply roller 81, which is an example of a first shape retainer sheet supplying unit, to the fibrous web forming machine 100. A nap raiser 200 raises nap on the surface of the first sheet N1 supplied from the first sheet supply roller 81; specifically, nap is raised on the surface that is to face the fibrous web S. The first sheet N1 supplied from the first sheet supply roller 81 serves as a base for a bottom surface (first surface) of the fibrous web S formed by the fibrous web forming machine 100.

Both woven fabric and nonwoven fabric, for example, can be used as the first sheet N1 in the present disclosure. Since airflow generated by a suction device 110 acts through the first sheet N1, a mixture of the defibrated material, the melting material, and the functional material is able to accumulate on the first sheet N1 properly. Due to the suction, the additives in waste paper and the print ink grains pulverized by the dry defibrator 30 are removed from the mixed defibrated material. The size of the mesh opening of the sheet may be preferably 100 µm or less. The first sheet N1 may be colored because it constitutes an exterior portion of the product. In the present embodiment, ecule (registered trademark) 3151A, which is a polyester filament nonwoven fabric manufactured using a spunbonding method by TOYOBO CO., LTD., is used as the first sheet N1.

The fibrous web forming machine 100 will now be schematically described. The fibrous web forming machine 100 includes a dispersion mechanism configured to uniformly disperse defibrated fibers in, for example, air, and a suction mechanism configured to suck the dispersed defibrated fibers onto a mesh belt 122.

The dispersion mechanism includes a forming drum. The mixed defibrated material and mix gas (mix air) are simultaneously supplied into the forming drum that rotates. A small-hole screen is provided on a surface of the forming drum 101. The defibrated fibers into which the melting material and the functional material have been mixed are discharged from the small-hole screen. The opening diameter of the drum mesh depends on the size of the mixed defibrated material. The shape of the opening may be a circular shape. Preferably, each opening may be an elongated hole of approximately 5 mm×25 mm to achieve both productivity and uniformity.

The mix gas (air) blends the defibrated material, the melting material, and the functional material for homogenization and causes the mixture to pass through the holes of the forming drum.

Current plates capable of adjusting uniformity in the width direction are provided below the forming drum. The mesh belt 122, which is an endless belt and on which a mesh stretched between tension rollers 121 is formed, is provided below the current plates. Transport gas (transport air) and mix gas (mix air) are sucked through a suction box. The amount of suction gas is set to be larger than the sum of the amount of the transport gas and the amount of the mix gas. By this means, it is possible to prevent materials and paper dust generated during defibration from being blown off. Since fine powders (waste powders) having passed through the first sheet N1 and the mesh belt 122 are contained in the suction gas, it is preferable to provide a cyclone or a filter dust collector downstream in order to separate the fine powders (waste powders) therefrom.

The mesh belt 122 is configured to move in the direction indicated by the arrows in the figure by drive rotation of at least one of the tension rollers 121 under the fibrous web forming machine 100. Dust, etc. on a surface of the mesh belt 122 is removed by a cleaning blade 123, which is in contact with the mesh belt 122. The mesh belt 122 may be cleaned using air.

The mesh belt 122 may be made of any material such as metal or resin as long as a sufficient amount of suction air is able to pass through the mesh belt 122 and in addition as long as the mesh belt 122 has sufficient strength to hold materials. If the hole diameter of the mesh is excessively large, a sheet surface will be formed into an irregular surface shape when a fibrous web S is formed. In order to avoid such surface irregularities, the hole diameter of the mesh is preferably approximately 60 µm to 125 µm. If the hole diameter of the mesh is less than 60 µm, it is difficult to form a stable flow of air by the suction device 110.

The first sheet N1 is supplied onto the mesh belt 122 from the first sheet supply roller 81 at a moving velocity that is the same as the moving velocity of the mesh belt 122. The suction device 110 can be formed by forming an airtight box having a window having a desired size under the mesh belt 122 and by sucking gas (for example, air) through a part of the box other than the window to evacuate the box.

In the configuration described above, the defibrated fibers transported through the transport pipe 60 are fed into the fibrous web forming machine 100 for forming the fiber structure M. The defibrated fibers pass through the small-hole screen on the surface of the forming drum 101 and accumulate on the first sheet N1 on the mesh belt 122 due to the suction force applied by the suction device 110. In this process, since the mesh belt 122 and the first sheet (N1) are moved, it is possible to produce a uniform sheet-like accumulation of the defibrated fibers on the first sheet N1, thereby forming the fibrous web S. The fibrous web S formed by accumulation of the defibrated fibers is heated and pressed to be formed into the fiber structure M having a sheet-like shape.

In the fibrous web forming machine 100, the density of the fiber structure M to be produced is determined by the amount of accumulation of the defibrated fibers and by a subsequent pressing process. For example, the defibrated fibers are accumulated to a height of approximately 40 to 60 mm in order to obtain the fiber structure M having, for example, a thickness of 10 mm and a density of approximately 0.1 to 0.15 g/cm$^3$.

In the present embodiment, for the purpose of mixing the melting-resin fibers and the fire retardant into the defibrated fibers transported through the transport pipe 60, the melting-material transport pipe 61 and the functional-material transport pipe 62, through which the respective materials are supplied separately, are connected to the transport pipe 60. However, the melting material and the functional material may be mixed, and the materials after the mixing may be supplied through one transport pipe connected to the transport pipe 60 through which the defibrated fibers are transported. Such a transport pipe may be provided in the fibrous web forming machine 100. If such a configuration is adopted, for example, the melting-resin fibers and the fire retardant whose amounts are metered are mixed in the forming drum 101.

In addition, it is possible to impart incombustibility to the formed fibrous web S by providing a liquid atomizer 130 and by adding a water-soluble fire retardant functioning as a functional material (for example, APINON-145 manufactured by SANWA CHEMICAL CO., LTD.) to liquid atomized by the liquid atomizer 130.

The second sheet (second shape retainer sheet) N2 is supplied from a second sheet supply roller 82, which is an example of a second shape retainer sheet supplying unit, to a subsequent process after the processes performed by the fibrous web forming machine 100 and the liquid atomizer 130. The nap raiser 210 raises nap on the surface of the second sheet N2 supplied from the second sheet supply roller 82; specifically, nap is raised on the surface that is to come into contact with the upper surface of the fibrous web S. The second sheet N2 supplied from the second sheet supply roller 82 becomes a cover of the upper surface (second surface) of the fibrous web S formed by the fibrous web forming machine 100.

Both woven fabric and nonwoven fabric, for example, can be used as the second sheet N2 in the present disclosure. In the present embodiment, similarly to the first sheet N1, ecule (registered trademark) 3151A, which is a polyester filament nonwoven fabric manufactured using a spunbonding method by TOYOBO CO., LTD., is used as the second sheet N2.

In the present embodiment, the first sheet N1 is supplied from the first sheet supply roller 81 to the fibrous web forming machine 100, and, after the fibrous web S is formed on the first sheet N1, the second sheet N2 is supplied from the second sheet supply roller 82 so as to cover the upper surface of the fibrous web S. Instead of these steps of the present embodiment, the following steps may be adopted. The first sheet supply roller 81 and the second sheet supply roller 82 are provided in a section after (downstream of) the fibrous web forming machine 100. The fibrous web S formed by the fibrous web forming machine 100 is then sandwiched between the first sheet N1 and the second sheet N2.

The fibrous web S whose second surface is covered by the second sheet N2 supplied from the second sheet supply roller 82 thereafter arrives at a heating-and-pressing mechanism 150.

Figure 3:
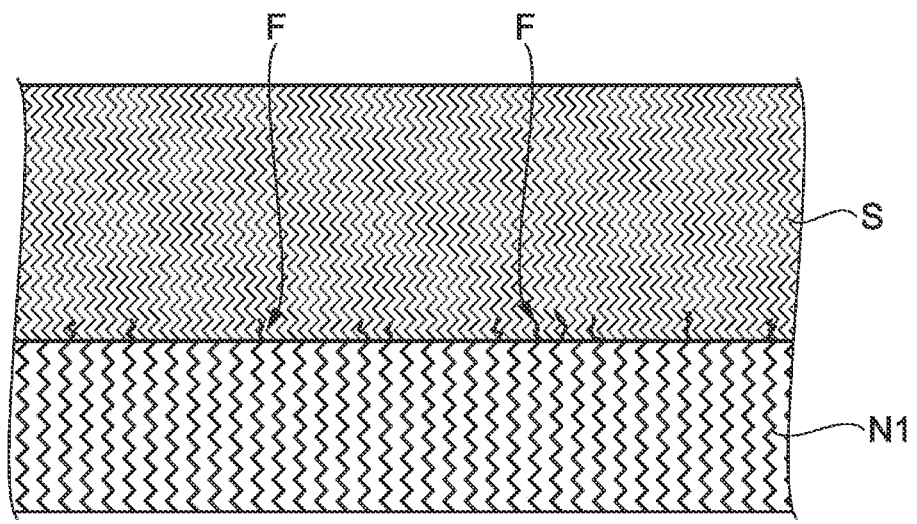
FIG. 3 is a schematic diagram that illustrates a nap-raised state.

In the fiber structure M before heating and pressing, the first sheet N1 is disposed in contact with the first surface of the fibrous web S, and the second sheet N2 is disposed in contact with the second surface of the fibrous web S. FIG. 3 is an enlarged schematic view of the interfacial surface portion of the first sheet N1 and the fibrous web S. Nap-raised portions F get into the fibrous web S from the first sheet N1. These portions getting into the fibrous web S become bonded when entangled therewith, especially when entangled with the melting fibers thereof, to produce anchoring effects and increase the strength of peeling resistance of the sheet.

Figure 4:
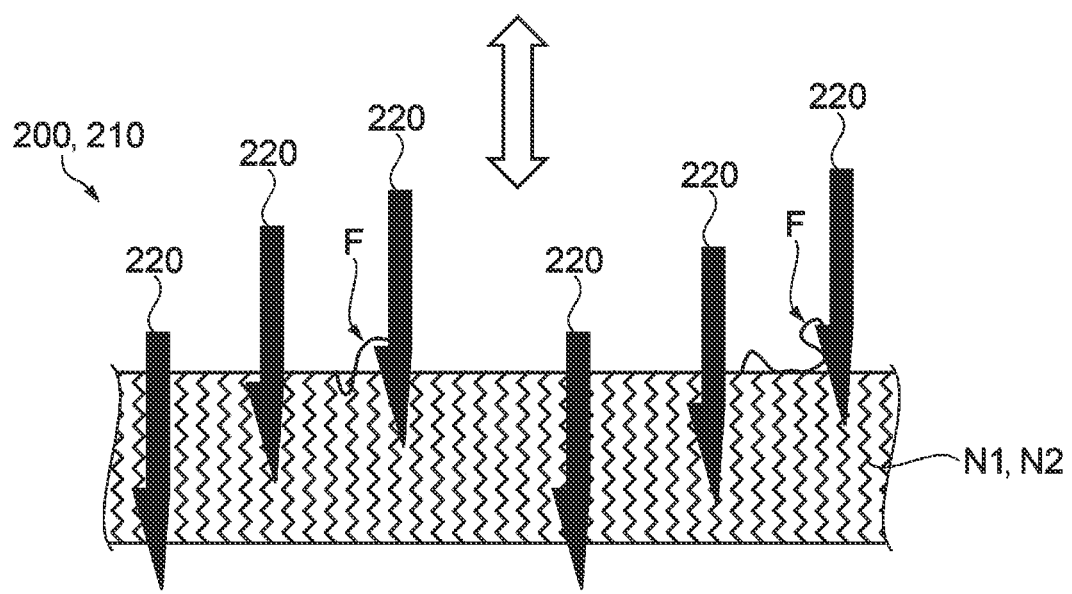
FIG. 4 is a schematic diagram that illustrates the configuration of a nap raiser.

There are several methods that can be used for raising nap by the nap raiser 200, 210. A certain example is schematically illustrated in FIG. 4. A plurality of needles 220 (10/cm² or so) each of which has a barb is provided. For example, it is possible to raise nap on the pulling-out-side surface by sticking the needles through the first, second sheet N1, N2 supported on a punching metal and then pulling out the needles. It is possible to increase the number of nap-raised portions by increasing the number of the needles. However, if the number of nap-raised portions is increased by increasing the number of the needles, the strength of the first, second sheet N1, N2 will decrease. Therefore, it is necessary to set an appropriate number.

The fibrous web S is transported to the heating-and-pressing mechanism 150. The heating-and-pressing mechanism 150 sandwiches the fibrous web S, which is a transported object, between a first substrate 151 and a second substrate 152 configured to move up and down, and applies heat and a pressing force to the fibrous web S simultaneously. Each of the first substrate 151 and the second substrate 152 includes a built-in heater. With this configuration, it is possible to heat the fibrous web S sandwiched between the first substrate 151 and the second substrate 152.

Since the fibrous web S is heated and pressed by the heating-and-pressing mechanism 150, the melting material mixed in the fibrous web S is heated and becomes bonded tightly to the defibrated fibers. This contributes to keeping the strength and shape of the fiber structure M and to preventing dispersion of fibers from the fiber structure M.

In addition, due to the melting and solidifying of the melting material, the first sheet N1 becomes bonded to the fibrous web S on the first surface of the fibrous web S, and the second sheet N2 becomes bonded to the fibrous web S on the second surface of the fibrous web S. It is possible to increase the strength of this bonding by producing anchoring effects by raising nap on the interfacial surface of the sheet.

Moreover, since the fibrous web S is heated and pressed by the heating-and-pressing mechanism 150, the strength of the fiber structure M further improves.

Although the heating process and the pressing process may be independently performed, it is preferable to simultaneously heat and press the material. Preferably, heating time should be long enough for the rising of temperature so as to cause the melting of the melting fibers near the cores of the material. Since heating and pressing is a batch process, in order to secure sufficient heating time, it is preferable to provide a buffer in a section before the heating-and-pressing mechanism 150. The buffer can be realized by moving up and down a so-called dancer roller (bridge roller) 141. The buffer may be provided in a section before the supply of the second sheet N2.

After the completion of heating and pressing, it is necessary to move the heated-and-pressed fiber structure M quickly and then set the next material to be pressed. For this purpose, it is preferable to provide a mechanism for inserting a crochet needle into the exit of the heating-and-pressing process to hold and draw out the heated-and-pressed fiber structure. There is a possibility of adhesion of fibers to the heating-and-pressing surface. Therefore, it is preferable to cover the heating-and-pressing surface with a sheet made of polytetrafluoroethylene (PTFE), etc., to which fibers do not adhere easily. More preferably, the mechanism may have a surface cleaner. Alternatively, the PTFE sheet may be reeled at predetermined time intervals. When the apparatus is not in operation, the heating-and-pressing mechanism is retracted by moving in a direction intersecting with the transport direction.

In the present embodiment, the heating-and-pressing mechanism 150 is made up of the first substrate 151 and the second substrate 152 configured to move up and down. However, the heating-and-pressing mechanism 150 may be made up of heating-and-pressing rollers. Since heating-and-pressing rollers make it possible to perform continuous forming, no buffer is necessary.

A sheet of the fiber structure M obtained through the recycling process described above is cut into a desired size and shape by a cutter 160. The cut sheets are stacked as a whole fiber structure on, for example, a stacker 170 and are cooled. For example, an ultrasonic cutter can be preferably used as the cutter 160. Cutting by such an ultrasonic cutter may be performed in a width direction of the fiber structure M or may be performed reciprocally in one direction and the other direction that is the opposite of the one direction along the width direction. A rotary cutter or an octagonal rotary cutter may be used instead of an ultrasonic cutter. A whole fiber structure is then cut with, for example, a Thomson die and is formed into a desired size and shape to form the recycled fiber structure M. The recycled fiber structure M can be suitably used as, for example, sound-absorbing materials, which absorb sound, cushioning materials (packing materials), which absorb shocks (external force), and materials for forming dies, etc.

Figure 5A:
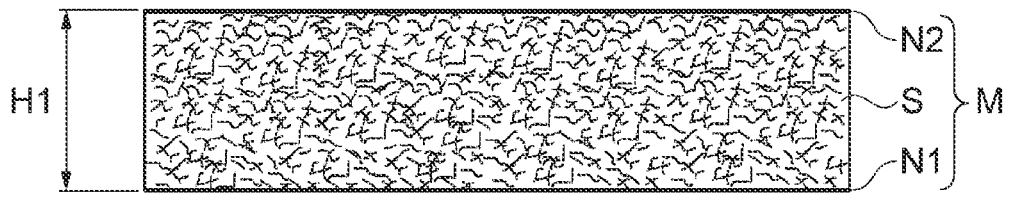
FIG. 5A is a schematic diagram that illustrates the configuration of a fiber structure.
Figure 5B:
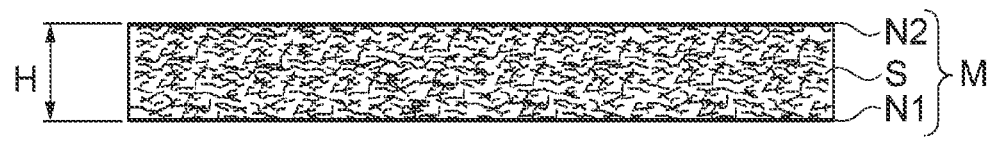
FIG. 5B is a schematic diagram that illustrates the configuration of the fiber structure.

In FIGS. 5A and 5B, a change in the state of the fiber structure M in a manufacturing process according to an exemplary embodiment of the present disclosure is illustrated. The state of the fiber structure M before heat and pressure are applied by the heating-and-pressing mechanism 150 is illustrated in FIG. 5A. The state of the finished fiber structure M, that is, the fiber structure M after heat and pressure are applied by the heating-and- pressing mechanism 150, is illustrated in FIG. 5B.

In the fiber structure M before heating and pressing, the first sheet N1 is disposed in contact with the first surface of the fibrous web S, and the second sheet N2 is disposed in contact with the second surface of the fibrous web S. The filaments in the fibrous web S illustrated in these figures are melting-resin fibers constituting the melting material. The fire retardant that is used as the functional material in the fibrous web S is not illustrated.

Although the fiber structure M after heating and pressing is the same as the fiber structure M before heating and pressing in that both have a layer structure in which the fibrous web S is sandwiched between the first sheet N1 and the second sheet N2, as a result of applying heat and pressure by the heating-and-pressing mechanism 150, in FIG. 5B, a thickness H after heating and pressing is approximately one tenth of a thickness H1 before heating and pressing. In the present embodiment, sandwiching between the first sheet N1 and the second sheet N2 in this way suppresses nap on the surface of the fiber structure M after manufacturing and enhances the ease of handling. At least one of the first sheet N1 and the second sheet N2 may be omitted.

The strength of bonding between the first sheet N1 and the fibrous web S and the strength of bonding between the second sheet N2 and the fibrous web S were tested, and an appropriate fiber diameter of the melting-resin fibers was selected. The results will now be described in detail.

Figure 6:
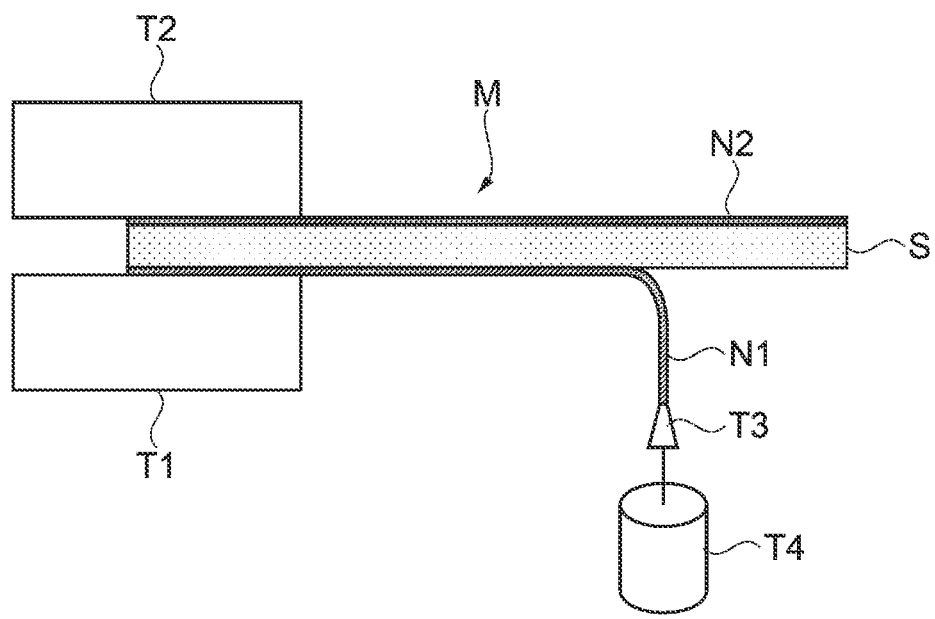
FIG. 6 is a schematic diagram that illustrates a method of a peeling test.

FIG. 6 is a diagram that schematically illustrates a method of a peeling test that was conducted in order to quantify the strength of bonding between the first sheet N1 (or the second sheet N2) and the fibrous web S. In FIG. 6, the fiber structure M that was used as a sample has a width of approximately 20 mm and a length of approximately 120 mm. One end of the fiber structure M was clamped between a table T1 and a holder plate T2. At the opposite end of the fiber structure M, the first sheet N1 was peeled off by approximately 15 mm. The end of the peeled-off portion of the first sheet N1 was clamped by a clamp T3. A weight T4 was suspended from the clamp T3. The minimum weight of the weight that caused consecutive peeling was measured. The strength of peeling resistance per unit width (N/m) was calculated from the minimum weight of the weight (kg)×9.8/width mm.

Figure 7:
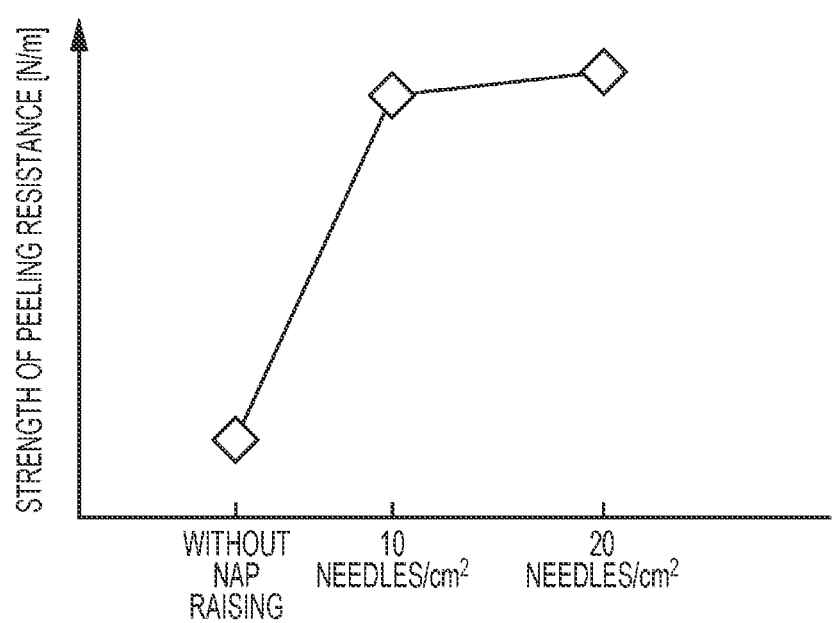
FIG. 7 is a graph that shows the results of the peeling test.

FIG. 7 illustrates the results of the peeling test. Specifically, FIG. 7 illustrates the strength of peeling resistance under the following conditions: a condition in which processing was performed once at arrangement density of nap-raising needles 220 of 10 needles/cm$^2$; a condition in which processing was performed twice at arrangement density of 20 needles/cm$^2$ with a half-pitch shift; a condition in no nap-raising processing was performed. As can be seen from FIG. 7, the strength of peeling resistance under the conditions in which nap-raising processing was performed using the needles 220 is greater than the strength of peeling resistance under the condition in which no nap-raising processing was performed. Specifically, the strength of peeling resistance under the conditions in which nap-raising processing was performed is approximately four to five times as great as the strength of peeling resistance under the condition in which no nap-raising processing was performed.

Next, another embodiment of the present disclosure will now be explained. FIG. 8 illustrates the configuration of a nap raiser 230 according to another embodiment. As illustrated in FIG. 8, the nap raiser 230 includes a supporting table 231, which supports the first sheet N1, transportation rollers 232a and 232b, which transport the supported first sheet N1 in the transportation direction, and a rotation roller 233, which is able to be in contact with the surface of the supported first sheet N1. The surface of the rotation roller 233 has a serrated portion 234. When the first sheet N1 moves to pass on the supporting table 231, the surface of the rotation roller 233 is pushed against the first sheet N1. The rotation roller 233 rotates to resist against the direction of transportation of the first sheet N1 by the transportation rollers 232a and 232b. By this means, it is possible to raise nap on the first sheet N. Preferably, the surface of the rotation roller 233 may be covered with hook-shaped thin metal wires such as those used for carding. The same processing can be performed for the second sheet N2.

Still another embodiment of the present disclosure will now be explained. FIG. 9 illustrates the configuration of a nap raiser 240 according to still another embodiment. The configuration illustrated in FIG. 9 is a table-less configuration. As illustrated in FIG. 9, the nap raiser 240 includes transportation rollers 242a and 242b, which transport the first sheet N1 in the transportation direction, transportation rollers 243a and 243b, which are provided upstream of the transportation rollers 242a and 242b in the transportation direction and transport the first sheet N1 in the transportation direction, and a rotation roller 245, which is provided between the pair of transportation rollers 242a and 242b and the pair of transportation rollers 243a and 243b in the transportation direction and is able to be in contact with the surface of the first sheet N1 supported by the pair of transportation rollers 242a and 242b and the pair of transportation rollers 243a and 243b. The surface of the rotation roller 245 has barbed hooks 246. The rotation roller 245 is in contact with the first sheet N1 due to its own weight.

Then, in a state in which the first sheet N1 is nipped by the transportation rollers 242a and 242b, the nap raiser 240 weakens the gripping of the first sheet N1 by the transportation rollers 243a and 243b. Because of the decrease in the gripping force, the rotation roller 245 moves to a lower position due to its own weight. With the lowering of the rotation roller 245, the first sheet N1 is supplied from the side where the transportation rollers 243a and 243b are provided, and the first sheet N1 sags between the pair of transportation rollers 242a and 242b and the pair of transportation rollers 243a and 243b.

Next, the first sheet N1 is nipped by the transportation rollers 243a and 243b at predetermined timing. After the nipping, the transportation rollers 242a and 242b are driven to transport the first sheet N1 in the transportation direction. The rotation roller 245 rotates to resist against the direction of transportation of the first sheet N1 by the transportation rollers 242a and 242b when the first sheet N1 is transported.

Then, the first sheet N1 becomes less loosened gradually between the pair of transportation rollers 242a and 242b and the pair of transportation rollers 243a and 243b. Because of an increase in a wrapped part, the sheet gets caught on a larger number of hooks. This makes it easier to raise nap on the surface of the sheet. Next, the driving of the transportation rollers 242a and 242b is stopped at predetermined timing. The intermittent operation described above is thereafter repeated.

The pair of transportation rollers 242a and 242b and the pair of transportation rollers 243a and 243b may be driven at the same time, and the rotation roller 245 may be in contact with the first sheet N1 that is transported at a constant speed to raise nap. Arterial driving may be performed by varying the transportation speed of the first sheet N1 or the rotation speed of the rotation roller 245.

In the fiber structure manufacturing apparatus 1 required for manufacturing the fiber structure M according to the present disclosure, and in a fiber structure manufacturing method required for manufacturing the fiber structure M, shape retainer sheets (the first sheet N1 and the second sheet N2) with raised nap are supplied to the first surface and the second surface, which is the opposite of the first surface, of the fibrous web S that contains melting-resin fibers mixed therein, and heat and pressure are applied simultaneously to the fibrous web S after the shape retainer sheets (the first sheet N1 and the second sheet N2) are supplied, thereby bonding the shape retainer sheets (the first sheet N1 and the second sheet N2) to the fibrous web S. Therefore, the fiber structure manufacturing apparatus 1 and the fiber structure manufacturing method according to the present disclosure make it possible to improve the bonding strength of the sheet, offer great ease of handling without problems such as the loss of a shape, and satisfy characteristics requirements of the fiber structure M required for various uses and applications.

Moreover, since the fiber structure manufacturing apparatus 1 and the fiber structure manufacturing method according to the present disclosure use as little water as possible (do not consume a large amount of water resources), it is possible to downsize water processing facilities and simplify the configuration of the apparatus; furthermore, a large-scale heater for drying is unnecessary, and energy efficiency in waste paper recycling is high.

In the fiber structure manufacturing method described above, the first sheet N1 and the second sheet N2 are supplied. However, the scope of the present disclosure is not limited to this example. As another fiber structure manufacturing method, the fiber structure M may be manufactured by: defibrating a fiber raw material that contains fibers by pulverization; transporting a defibrated material after defibration, and mixing a melting material into the defibrated material that is being transported; forming a fibrous web S by causing a mixture of the defibrated material and the melting material to accumulate; supplying a shape retainer sheet to the fibrous web S in such a state that nap is raised on a surface, of the shape retainer sheet, that is to be in contact with the fibrous web S; and forming the fiber structure M by heating and pressing the fibrous web S after the shape retainer sheet (for example, the first sheet N1) is supplied. That is, either one of the first sheet N1 and the second sheet N2 may be supplied. Even if configured in this way, it is possible to obtain the same or similar effects as those described above.

What is claimed is:

1. A fiber structure manufacturing apparatus, comprising:
a defibration unit that includes a rotating rotor and a stator, the defibration unit pulverizing and defibrating a fiber raw material that contains fibers;
a transportation unit connected to the defibration unit, the transportation unit transporting a defibrated material after defibration by the defibration unit;
a melting-material mixing unit connected to the transportation unit, the melting-material mixing unit mixing a melting material into the defibrated material transported by the transportation unit;
a fibrous web forming unit that includes a forming drum that is connected to the melting-material mixing unit, the fibrous web forming unit forming a fibrous web by causing a mixture of the defibrated material and the melting material to be accumulated;
a belt disposed so as to face the forming drum, the belt transporting the fibrous web;
a sheet supplying roller supplying a shape retainer sheet on the belt or to the fibrous web, the sheet supplying roller being disposed upstream relative to the belt in a transport direction of the shape retainer sheet, or downstream relative to the belt in a transport direction of the fibrous web;
a heating-and-pressing mechanism disposed downstream relative to the sheet supplying roller in the transport direction of the shape retainer sheet, the heating-and-pressing mechanism forming a fiber structure by heating and pressing the fibrous web after the shape retainer sheet is supplied; and
a nap raiser disposed, in the transport direction of the shape retainer sheet, between the sheet supplying roller and the belt, or the sheet supplying roller and the heating-and-pressing mechanism, the nap raiser raising nap on a surface of the shape retainer sheet, is the surface being to be in contact with the fibrous web.

2. A fiber structure manufacturing method, comprising:
defibrating a fiber raw material that contains fibers by pulverization;
transporting a defibrated material after defibration, and mixing a melting material into the defibrated material that is being transported;
forming a fibrous web by causing a mixture of the defibrated material and the melting material to accumulate on a belt;
supplying, by a sheet supplying roller, a shape retainer sheet on the belt or to the fibrous web, the sheet supplying roller being disposed upstream relative to the belt in a transport direction of the shape retainer sheet, or downstream relative to the belt in a transport direction of the fibrous web;
raising nap on a surface of the shape retainer sheet before the surface of the shape retainer sheet contacts with the fibrous web; and
forming a fiber structure by heating and pressing the fibrous web after the shape retainer sheet is supplied.

3. A fiber structure manufacturing method, comprising:
defibrating a fiber raw material that contains fibers by pulverization;
transporting a defibrated material after defibration, and mixing a melting material into the defibrated material that is being transported;
forming a fibrous web by causing a mixture of the defibrated material and the melting material to accumulate on a surface of a first shape retainer sheet while the first shaped retainer sheet is disposed on a belt, the surface of the first shape retainer sheet having raised nap;

supplying, by a sheet supplying roller, a second shape retainer sheet to an opposite surface side of the fibrous web such that a surface of the second shape retainer sheet comes into contact with the fibrous web, the opposite surface side being opposite of a surface side at which the first shape retainer sheet is disposed, the sheet supplying roller being disposed downstream relative to the belt in a transport direction of the fibrous web;

raising nap on the surface of the second shape retainer sheet before the surface of the second shape retainer sheet comes into contact with the fibrous web; and forming a fiber structure by heating and pressing the fibrous web sandwiched between the nap-raised surface of the first shape retainer sheet and the nap-raised surface of the second shape retainer sheet.

4. The fiber structure manufactured using the fiber structure manufacturing method according to claim 2.

5. The fiber structure manufactured using the fiber structure manufacturing method according to claim 3.

6. The fiber structure manufacturing apparatus according to claim 1, wherein the nap raiser includes a plurality of needles to raise the nap.

7. The fiber structure manufacturing apparatus according to claim 1, wherein the nap raiser includes a rotation roller that has a serrated surface to raise the nap.

8. The fiber structure manufacturing apparatus according to claim 1, wherein the nap raiser includes a rotation roller that has a surface with hooks to raise the nap.

* * * * *